March 28, 1950
A. KINKEAD
2,502,012
APPARATUS AND METHOD FOR CONTINUOUS
MANUFACTURE OF SEAMED TUBING
Filed May 26, 1947
11 Sheets-Sheet 1
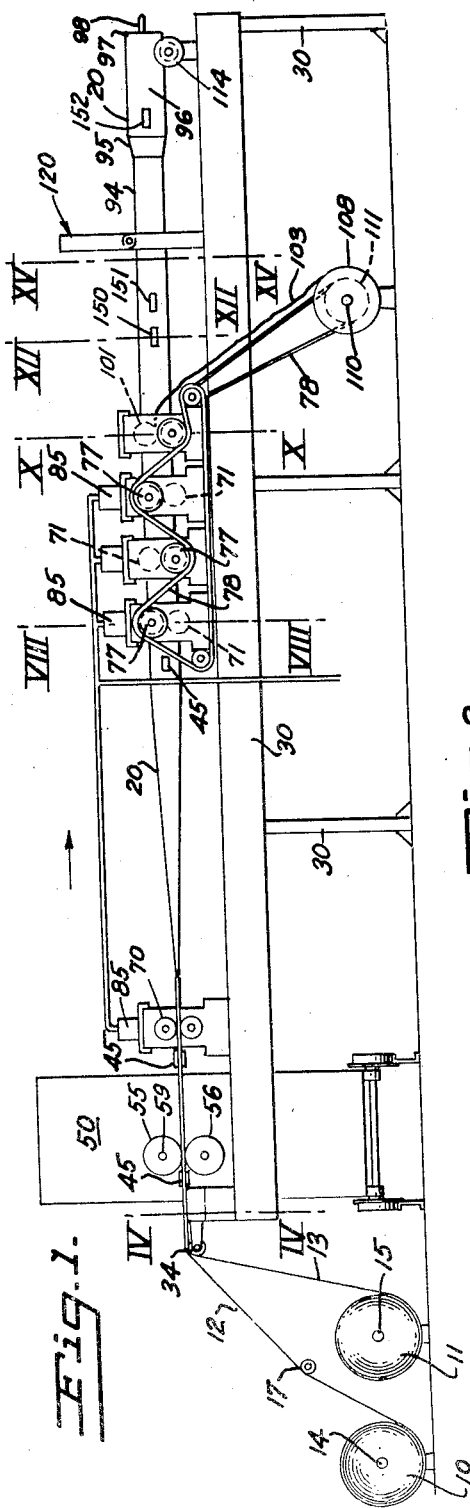
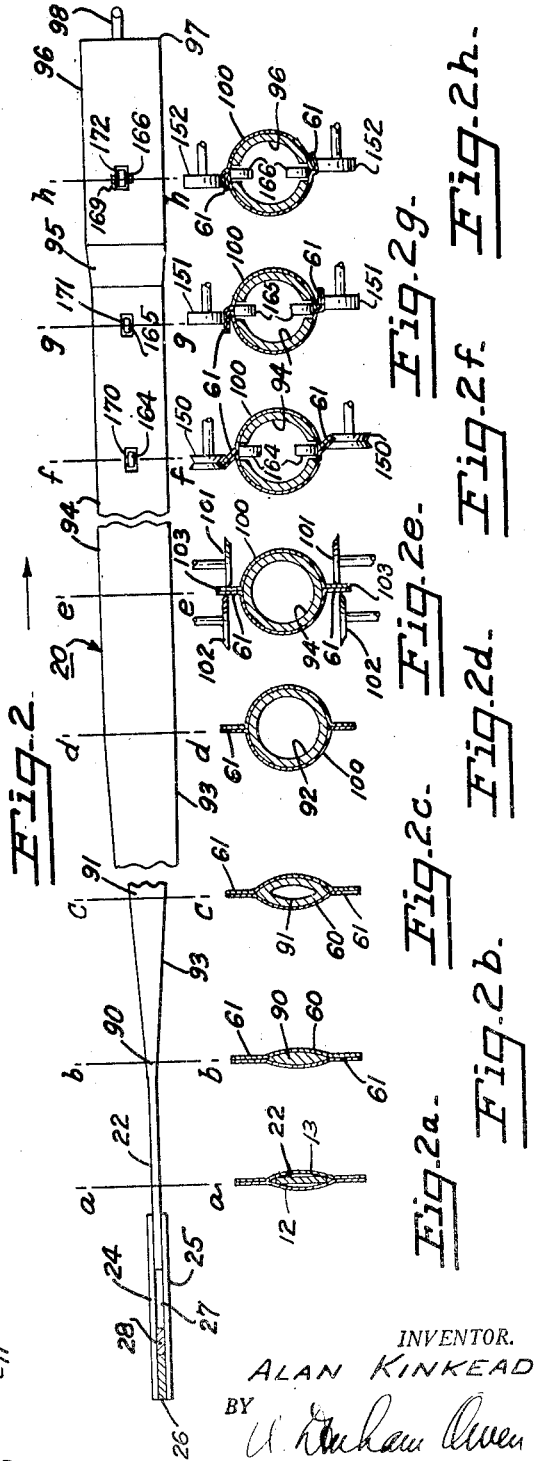
INVENTOR.
ALAN KINKEAD
BY
ATTORNEY

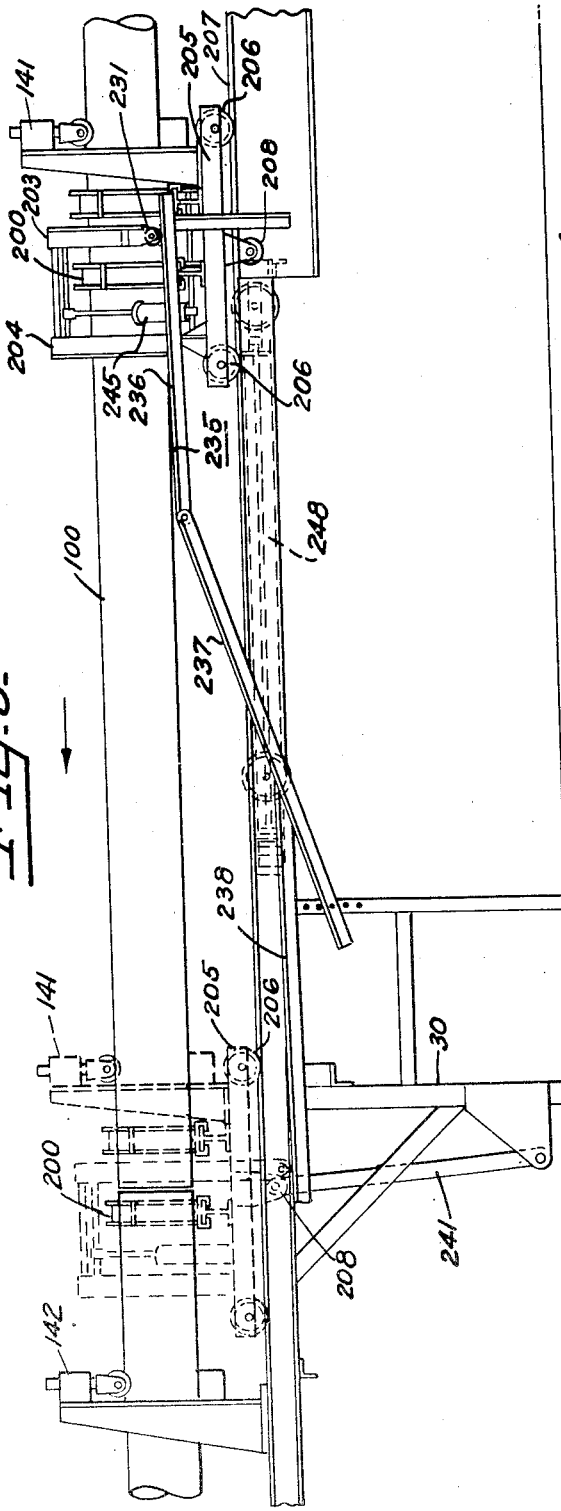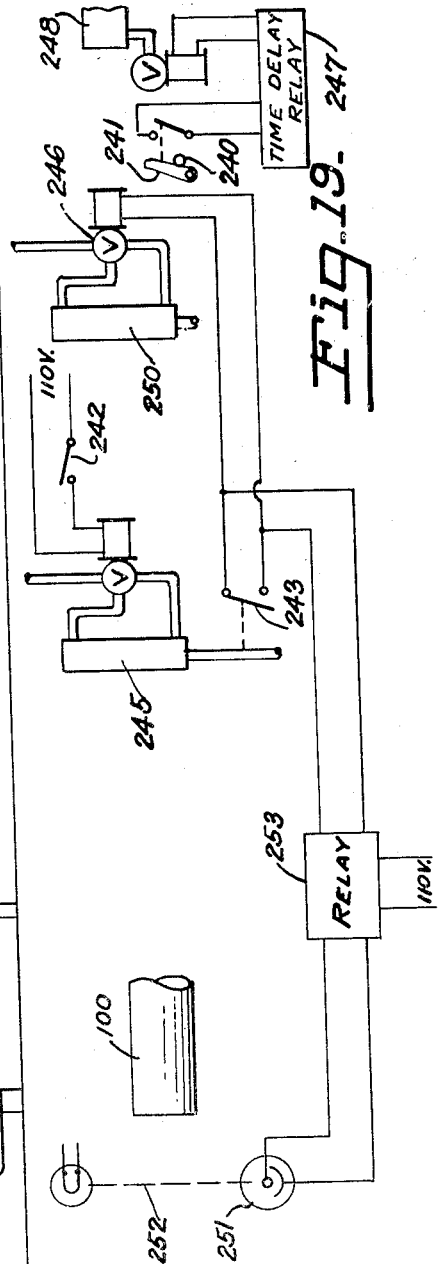

March 28, 1950
A. KINKEAD
2,502,012
APPARATUS AND METHOD FOR CONTINUOUS
MANUFACTURE OF SEAMED TUBING
Filed May 26, 1947
11 Sheets-Sheet 3
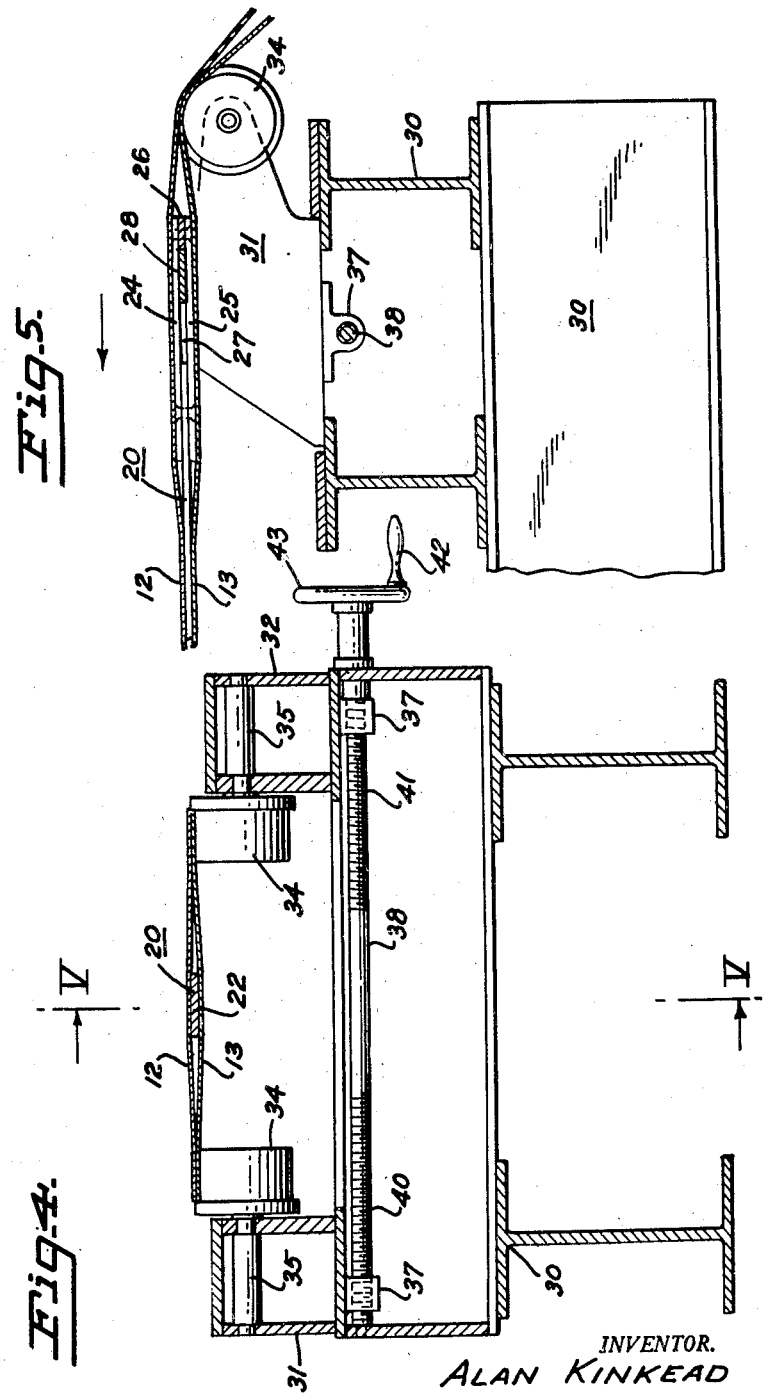
INVENTOR.
ALAN KINKEAD
BY
ATTORNEY

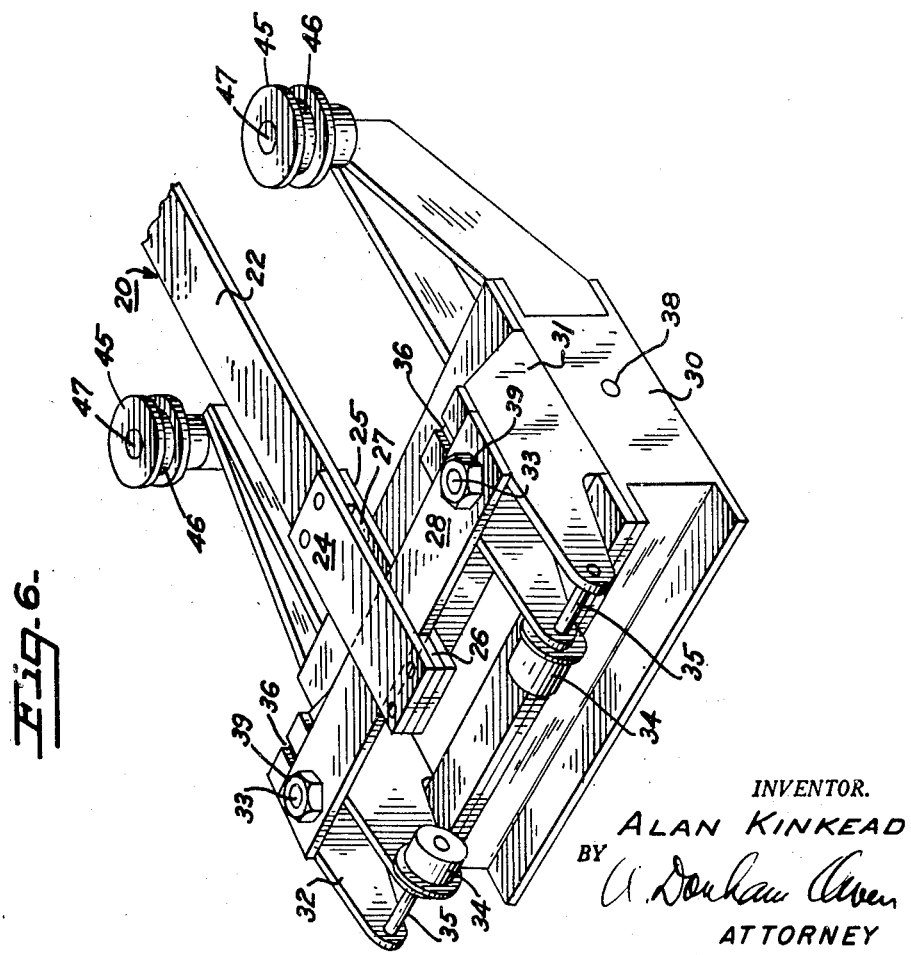

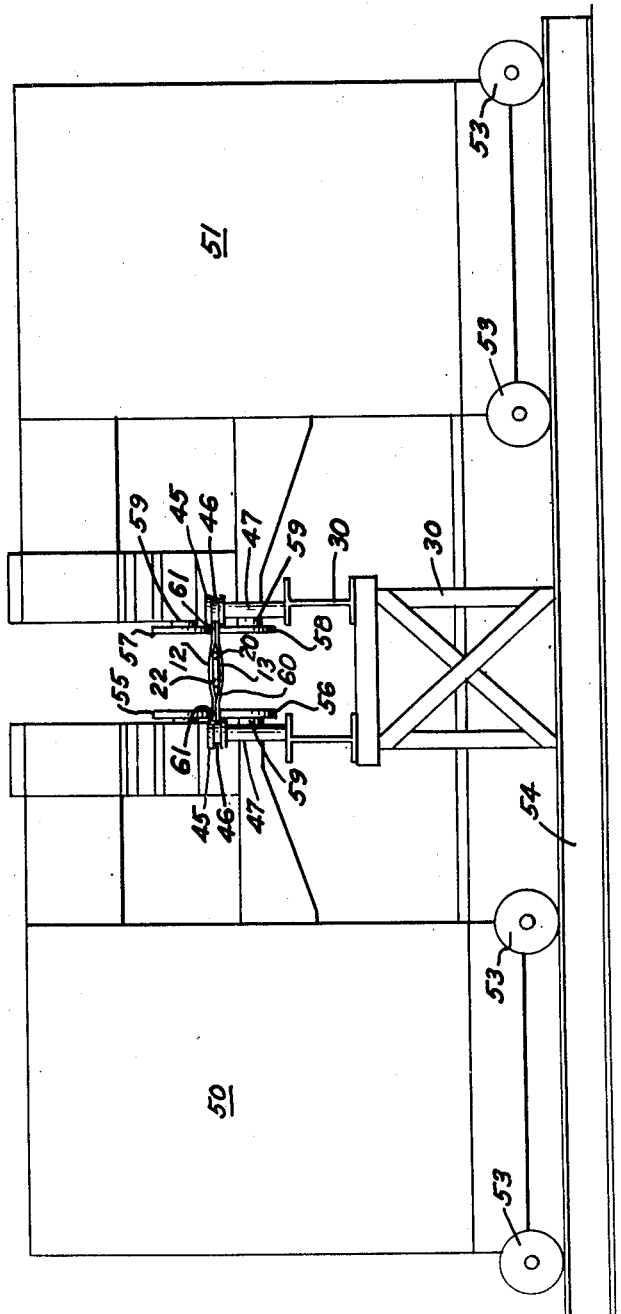

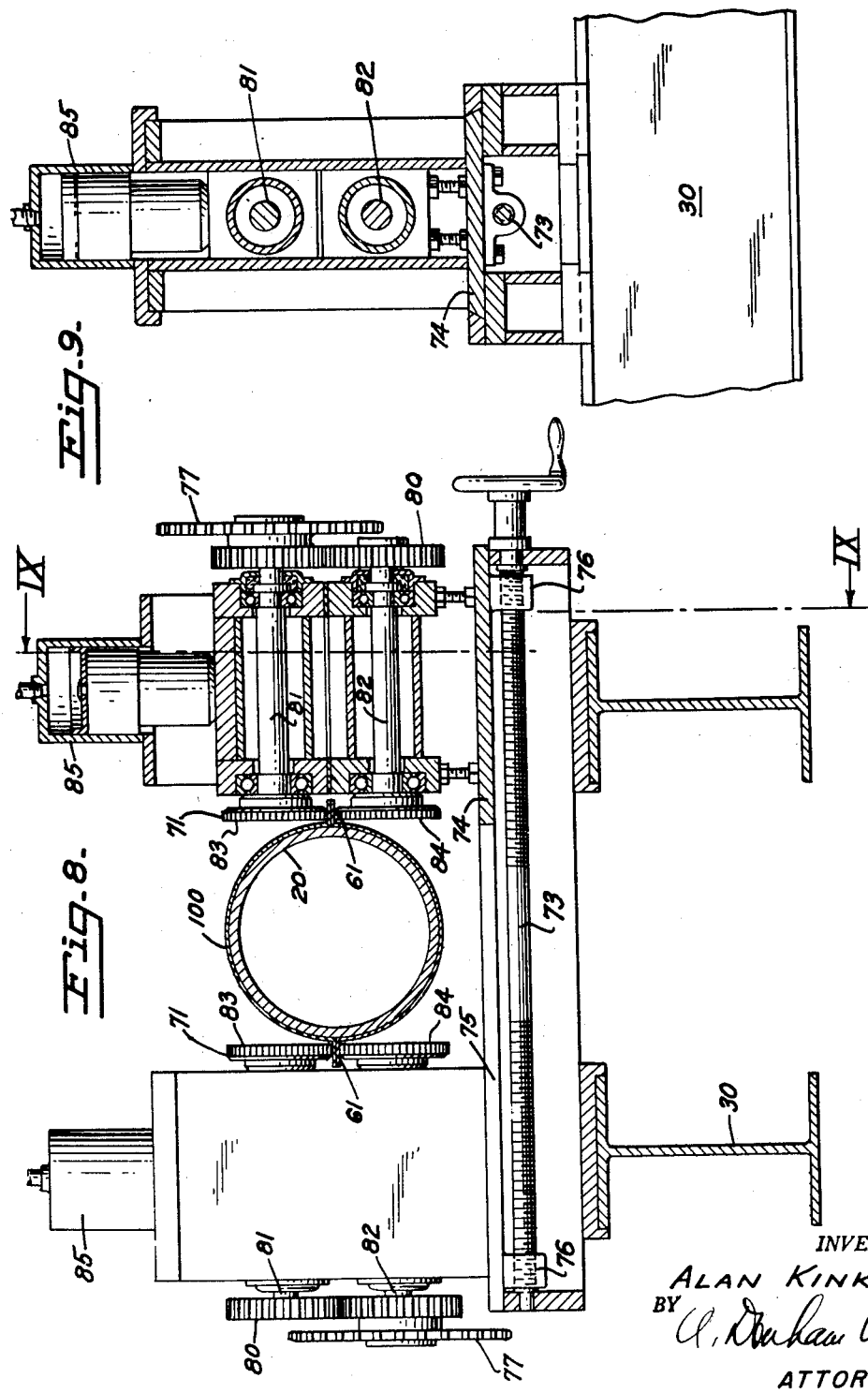

March 28, 1950
A. KINKEAD
2,502,012
APPARATUS AND METHOD FOR CONTINUOUS MANUFACTURE OF SEAMED TUBING
Filed May 26, 1947
11 Sheets-Sheet 7
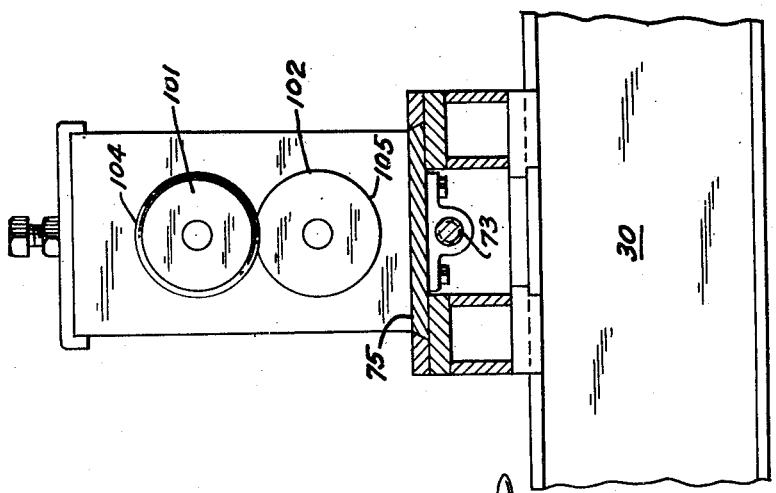
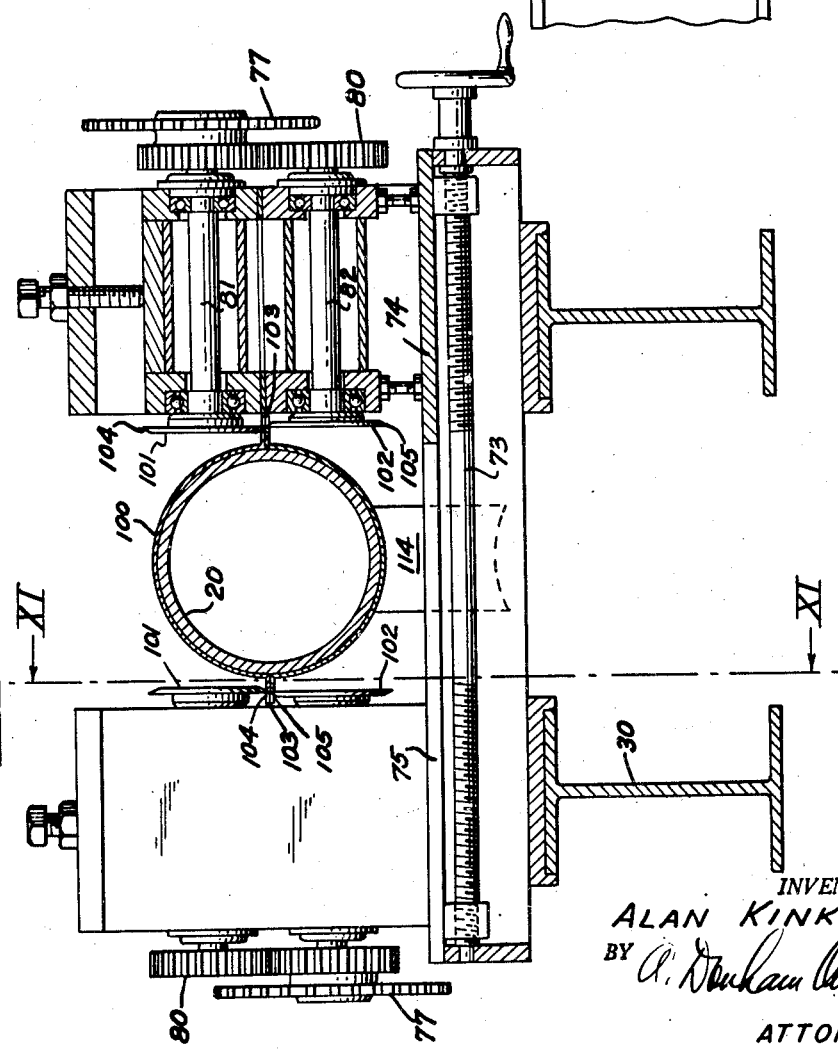
INVENTOR.
ALAN KINKEAD
BY
ATTORNEY

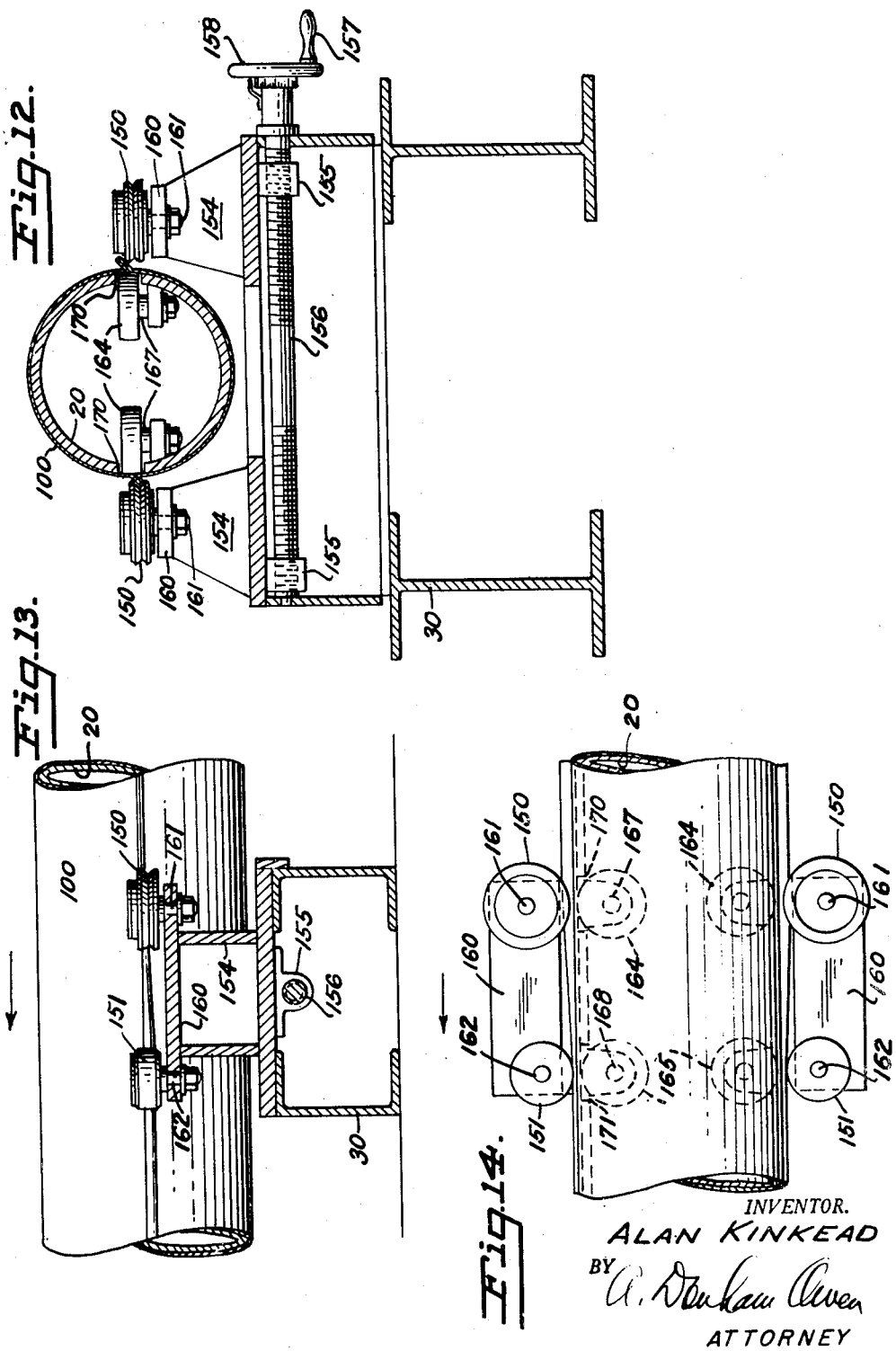

March 28, 1950
A. KINKEAD
2,502,012
APPARATUS AND METHOD FOR CONTINUOUS
MANUFACTURE OF SEAMED TUBING
Filed May 26, 1947
11 Sheets-Sheet 9
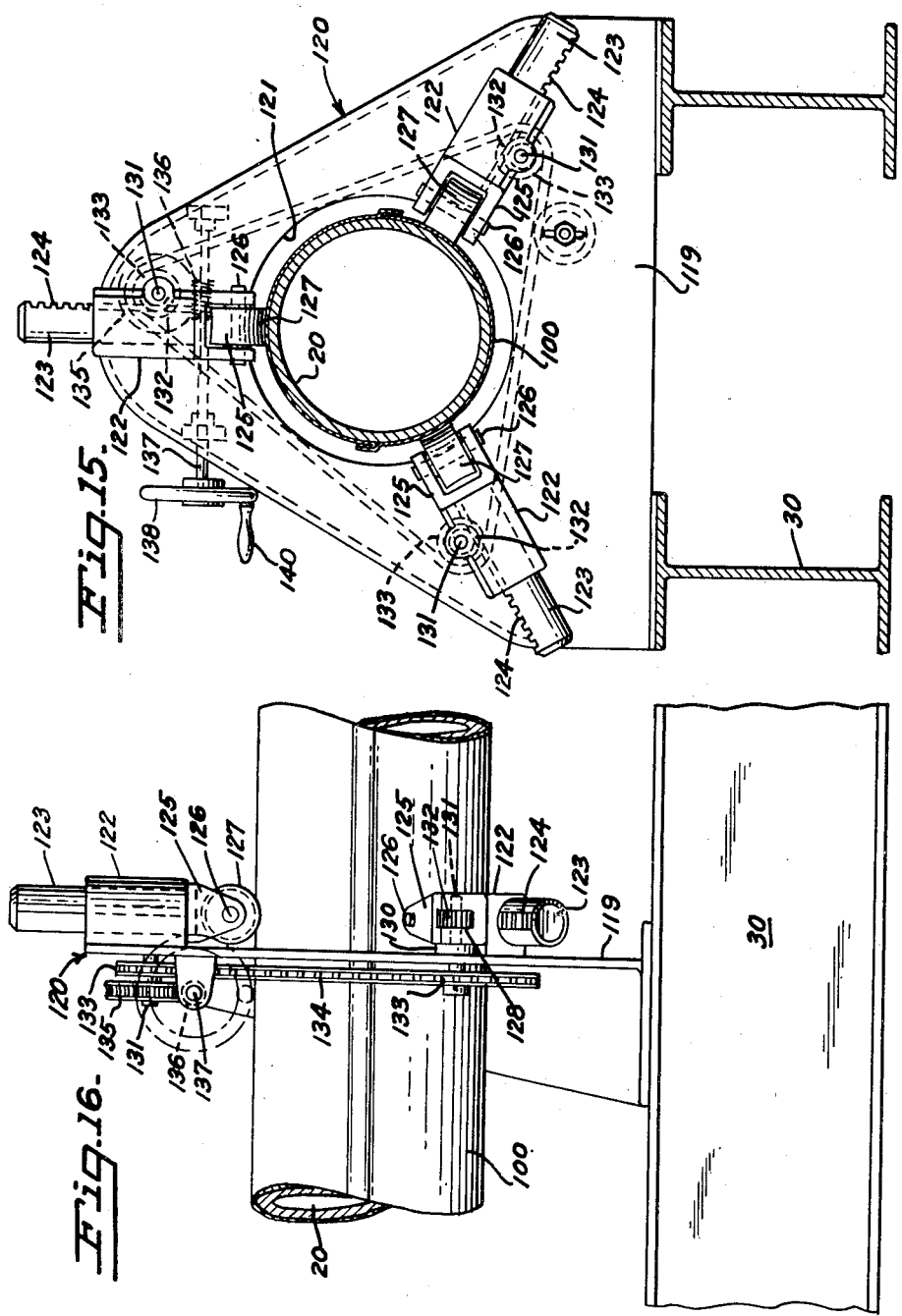
INVENTOR.
ALAN KINKEAD
BY
ATTORNEY

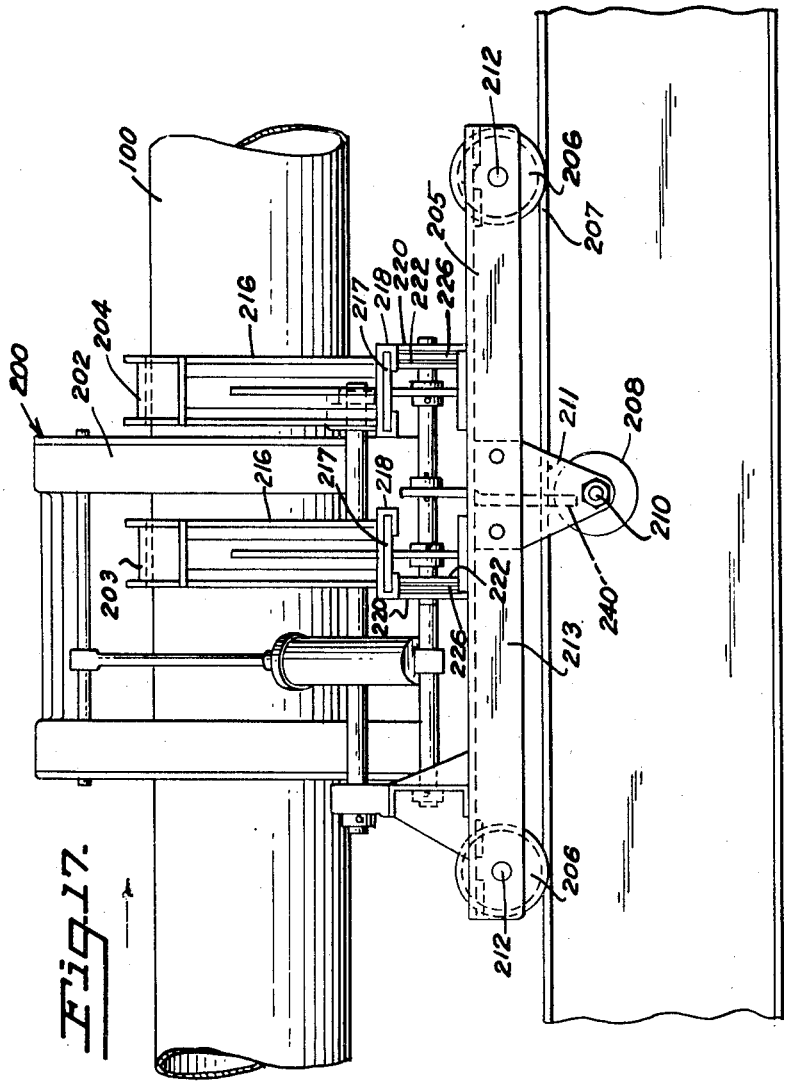

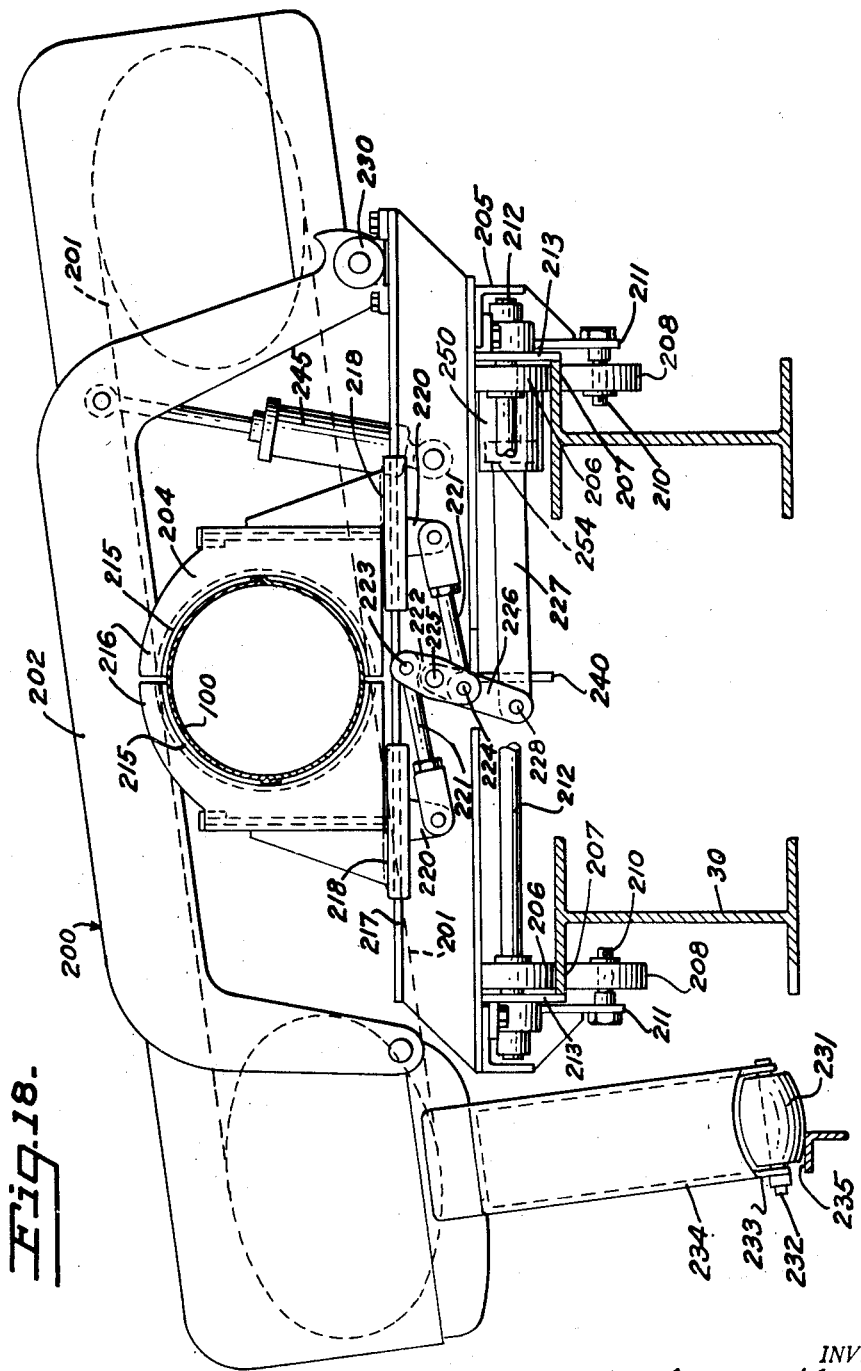

Patented Mar. 28, 1950

2,502,012

UNITED STATES PATENT OFFICE 2,502,012

APPARATUS AND METHOD FOR CONTINUOUS MANUFACTURE OF SEAMED TUBING

Alan Kinkead, Menlo Park, Calif., assignor to W. R. Ames Company, San Francisco, Calif., a corporation of California Application May 26, 1947, Serial No. 750,566

18 Claims. (Cl. 113—33)

This invention relates to an apparatus and a method for continuous manufacture of seam welded tubing, particularly from rolls of relatively thin, strip-sheet stock. The present application is a continuation-in-part of an earlier application, Serial Number 563,969, filed November 17, 1944, which is now abandoned.

The present invention was born following a fruitless search for years for a single machine which would make thin walled welded tubing in a variety of sizes.

The problem has been to find an economical and practical method and apparatus by which to produce thin walled welded tubing including the following features:

(a) To make a variety of sizes on a single machine;

(b) To make each size with various wall thicknesses;

(c) To be able to change production from one size to another in a short time (one hour or less); and (d) To accomplish all of the above with a relatively inexpensive machine and at low production costs.

The prior art failed to reveal any machine or method capable of accomplishing the above.

The prior art machines entailed the use of a large number of forming rolls (usually about 16) which had to be carefully machined to very close tolerances and usually each set of rolls could be used only on a single size pipe of a given gauge. When a thicker or thinner gauge was to be used a different set of rolls were needed. Not only was the investment in rolls very large but also the time required to change from one set of rolls to another was so great as to make it very impractical except on large runs. In practice the difficulty of changing rolls meant that a separate machine was usually installed for each size of pipe. This limited the manufacture of pipe to large plants or if few machines were owned the manufacturer was limited in the sizes he could make. Furthermore, with any of these prior art machines it was not practical and economical to make welded tubing with wall thicknesses much thinner than 1/60th of the diameter of the pipe. For example, on an 8" welded pipe the wall thickness would be about 1/8 of an inch.

The invention described in the present application makes it possible on a single machine to make continuous welded tubing of very thin walled material (0.025" to 0.050") in a great range of diameters (3" to 12" and greater) without any forming rolls, merely by changing the mandrel and adjusting the other parts. The product of the machine is new. The demand has long existed. Heretofore thin walled pipe has been made in short lengths by hand processes, using rivets, lock seams, etc. with a resulting product greatly inferior to a seam welded pipe such as produced by the present invention.

The method of this invention includes the steps of:

(1) Bringing together two continuous strips of flat stock over a mandrel, (2) Seam welding the edges of the two strips together while their central portion is over the end of the mandrel, (3) Forming the pipe over the mandrel, and (4) Cutting off the desired length of tubing.

Twin-seamed welded tubing results from employment of this method, which has proven very successful in practice.

Another achievement of the invention is to provide machinery by which welded seamed tubing can be manufactured economically continuously automatically or semi-automatically, and can be cut to any desired length after being otherwise completed. The tubing or pipe of the kind here contemplated, among other things, is used extensively for portable irrigation pipe.

Other objects and advantages of the invention will appear from the following description, given pursuant to U. S. Revised Statutes, section 4888, without intending thereby to limit the invention except as defined by the appended claims.

THE DRAWINGS

In the drawings:

Fig. 1 is a view in side elevation of the front portion of a device embodying the principles of this invention, the device is shown somewhat in diagrammatic form and is generally simplified so that as much as possible of the more important parts may be shown in one view;

Fig. 2 is a view in side elevation of the mandrel, broken in the middle and somewhat foreshortened so that it can be shown in large size on one sheet; at several points below the mandrel are cross-sectional views Figs. 2a to 2h of the mandrel, each showing its shape and the shape of the pipe at the point of the cross-section;

Fig. 3 is a back view in side elevation of the after part of the device not shown in Fig. 1, and includes the pipe cut-off unit; in this view the made pipe is moving to the left, whereas Figs. 1 and 2 are front side views, and the pipe is moving to the right; the cut-off saw is shown in solid lines at the beginning of its travel and in dotted lines at the end of it travel;

Fig. 4 is a view in elevation taken along the line IV—IV in Fig. 1, looking from the right to the left, showing the part of the machine where the strips of material are first closed together at their edges around the mandrel;

Fig. 5 is a view in side elevation and section along the line V—V in Fig. 4;

Fig. 6 is a view in perspective of the mandrel anchor and rollers shown in Figs. 4 and 5;

Fig. 7 is a view in front elevation of the seaming station, looking from the left of Fig. 1 along the line IV—IV;

Fig. 8 is a view looking from the left in Fig. 1 along the line VIII—VIII, showing one set of driving rolls;

Fig. 9 is a view taken along the line IX—IX in Fig. 8;

Fig. 10 is a view taken along the line X—X of Fig. 1, showing the trimming rolls;

Fig. 11 is a view taken along the line XI—XI of Fig. 10;

Fig. 12 is a view in section taken along the line XII—XII in Fig. 1, showing a pair of the rollers which curl the seams in against the pipe;

Fig. 13 is a view of Fig. 1 in the vicinity of the line XII—XII looking from the side at two of the curling rollers;

Fig. 14 is a plan view looking down on Fig. 13;

Fig. 15 is a view taken along the line XV—XV of Fig. 1, showing a steady rest;

Fig. 16 is a view in elevation looking at the steady rest from the side;

Fig. 17 is a view in side elevation of the cut-off saw showing it in its end position when it has cut through the tubing;

Fig. 18 is a front view of the cut-off saw upon completion of a cut; and

Fig. 19 is a diagrammatic view of the electric-eye and relay systems operating the cut-off saw.

GENERAL DESCRIPTION

(Figs. 1 to 3)

The machine here described is designed for continuous and automatic manufacture of twin-seamed tubing of any desired length or lengths. Two flat strips are brought into position on opposite sides of a substantially flat mandrel from two rolls of strip stock. They are welded at each side while the two strips are still substantially flat and are passing over the mandrel. The mandrel is tapered from a flat strip to a cylinder, and imparts this cylindrical shape to the welded strips as they are impelled along the mandrel. The welded impelling seams are then trimmed, if desired, and can be curled and bent in against the side of the pipe. Preferably the cylindrical section of the mandrel is enlarged so that the pipe is stretched beyond its elastic limit as it nears the cut-off station to give the pipe further rigidity as well as to remove any tendency for it to twist. The process is completed when the desired length of pipe is cut from the continuously forming tube.

STRIP STOCK

(Fig. 1)

Two rolls 10 and 11 of strip rock 12 and 13 are supported for free rotation on the axles 14 and 15. One strip 12 of sheet stock is brought over the top of the mandrel 20, and the other strip 13 is brought in under the mandrel 20. Guide rollers, such as the rollers 17 or other feeding means may be used to control the path of the strips 12 and 13 from the rolls 10 and 11 to their proper positions above and below the mandrel 20.

ANCHORING MEANS FOR THE MANDREL

(Figs. 1, 2, and 4 to 6)

The mandrel 20 begins as a flat strip 22, shown in section in Fig 2a below Fig. 2. The mandrel 20 must be capable of enduring a considerable stretching force acting over its whole length and must be firmly anchored at this end, especially since it is preferable not to anchor the opposite end of the mandrel 20. One end of each of two plates 24 and 25 are welded or bolted securely to the flat mandrel strip 22, and an anchor block 26 is welded or bolted between the opposite ends of the plates 24 and 25. (See Fig. 6.) The anchor plate 28 is passed through the slot 27 between the plates 24 and 25, and is rigidly fixed at each end to the brackets 31 and 32 of the main frame 30.

The length of the slot 27 is substantially greater than the width of the anchor plate 28, and there is enough clearance between the plate 28 and the plates 24 and 25 so that it will move back and forth between them freely. When the machine is being operated, the anchor block 26 is pulled against the anchor plate 28, but whenever the machine is to be stopped, the seam welder halts the welding just before the pipe stops moving. To avoid waste of material, the sheet stock must be backed up in the machine before it is started again. The slack space in the slot 27 permits the whole mandrel 20 to be backed up at this time, so the welding can be resumed where it left off. Additional movement fore and aft of the mandrel may be obtained by loosening the nuts 39 on the bolts 33 which hold the anchor plate to the brackets 31 and 32, and moving the bolts in the slots 36.

When it is desired to make a different size of pipe, all that is required is a mandrel 20 of different diameter. Herein lies one of the great advantages of this method and apparatus as distinguished from prior art pipe forming machines which require the changing of a large number of expensive forming rolls, with a consequent long shut down period for the make ready.

To change mandrels, the anchor plate 28 is unbolted and removed from the slot 27. After the mandrel has been replaced and the distance between the brackets 31 and 32 has been adjusted for the mandrel and the different size of strip stock, the appropriate size of anchor plate 28 is inserted to hold the new mandrel.

The rollers 34, over which the strips 12 and 13 pass on their way to the mandrel 20, are mounted for free rotation on stub shafts 35 which are journaled into the brackets 31 and 32. At the bottom of each of the brackets 31 and 32 is a threaded collar 37 which engages the threads 40 and 41 on the axle 38. At one end of the axle the thread 40 is left-hand, and at the other end of the axle 38 the thread 41 is right-hand. By rotating the handle 42 on the wheel 43, the operator can move the brackets 31 and 32 and their dependent parts closer to each other or further apart. Similar adjustable apparatus in other pertinent parts of the machine, enables the manufacture of several different sizes of pipe in the same machine merely by substituting a different size mandrel and a few dependent parts and then adjusting the other parts of the machine to the new size. The changeover can be made within a relatively short period of time.

SEAMING STATION

(Fig. 7)

When the two strips of stock 12 and 13 are positioned above and below the mandrel 20, they are ready to be seamed to form a continuous envelope 60 substantially flat at that point. To keep the edges of the strips 12 and 13 together as they approach the seaming station, a pair of guide rollers 45 are used, each having a grooved guide slot 46. Additional rollers 45 may be mounted on the machine before and after the seaming operation to guide the strips or seamed envelope and prevent damage to it. Such a set are shown mounted on the stub shafts 47, which are attached to the main frame 30.

The preferable method of seaming the strips together is that of seam welding. Two standard continuous seam welding machines 50 and 51 may be used. It is preferable that they be of the type that can be adjusted by machinery inside the cabinet (not illustrated) to give a range of different seams and speeds.

The main frames 50 and 51 of the seam welders are preferably mounted on wheels 53 which roll on rails 54 transverse to the main frame 30 and preferably have a means to lock them at any desired position along the rails. Welders of this type are easily adjusted to accommodate many different pipe sizes. It is also preferable that the pipe be cooled by a steady stream of water to dissipate as soon as possible the heat from the welding operation.

The welding machine 50 has the two disc electrodes 55 and 56, and the machine 51 has corresponding disc electrodes 57 and 58. Each of the wheels 55, 56, 57, and 58 is mounted for free rotation on stub shafts 59 and none is intended to drive the strips 12 and 13. At regularly timed intervals, current passes between each pair of electrodes and spot welds a small area of the strips 12 and 13 together. The period of this interval is adjusted in relation to the speed at which the strips pass over the welding wheels 55, 56, 57, and 58 so that the spot areas join to form a continuous seam 61 on each side of the substantially flat envelope 60. The net result of the welding operation is thus to join the two strips 12 and 13 at that point into a seamed tubular envelope 60 around the substantially flat mandrel section 22.

FEED ROLLS

(Figs. 1, 8, and 9)

When new rolls of strip material 10 and 11 are installed, the strips 12 and 13 are brought by hand around the mandrel 20 and past the separated rolls of the seaming station to the initial driving rolls 70 by which the tube is mechanically propelled along the first part of the mandrel 20. (Most of the propelling power is preferably applied to the tube's seams along subsequent portions of the mandrel 20 after it has been formed into a substantially cylindrical shape.) On each side of the flat strip portion 22 of the mandrel 20 and just beyond the seam welding machines 50 and 51 is the initial pair of driving rolls 70 which drive the still flattened envelope 60 over the mandrel 20. It is preferable to have pairs of lateral guide rolls 45 in front of these feed rolls 70 and in front of at least the first of the several pairs of feed rolls 71. The feed rolls 70 and 71 are preferably of identical design and comprise the entire driving mechanism which propels the tube along the mandrel. In Fig. 1, three sets of feed rolls 71 are illustrated, though there might be more or fewer of them. One of these, which could be any one of the four rolls 70 and 71 illustrated, is shown in more detail in Figs. 8 and 9.

The main machine frame 30 supports the driving rolls 70 and 71 at a convenient height alongside the mandrel, and the threaded axle 73, similar to the axle 38, is used for moving the pairs of rolls 71 closer to or further from the mandrel. For that purpose, below each carriage 74 and 75 is a collar 76, similar to the collar 37 and similarly slidable along over the opositely threaded ends of the axle 73.

The geared sprocket wheels 77 are synchronized by a continuous chain drive 78 and are provided with identical reduction gear systems 80 which drive the axles 81 and 82 on which are keyed the knurled wheels 83 and 84. The knurled wheels 83 and 84 dig into the seamed edges 61 and propel the tube 100 along the mandrel. Considerable power and a high degree of traction is necessary, and the construction must be rugged throughout. The hydraulic cylinders 85 maintain and equalize the pressure of the knurled wheels 83 and 84 on the seams 61, so that all the rolls 70 and 71 drive at the same speed and pressure. The driving means is preferably made reversible so that the tube 100 and the mandrel 20 may be backed up before starting the machine after it has been stopped, for the reason already explained.

FORMING OPERATION

(Figs. 1 and 2)

The tube 100 is formed from the substantially flat envelope 60 (see Fig. 2b) by propelling it along the mandrel 20. No special forming machinery or expensive shaping rolls are needed, for the tube conforms itself to the shape of the mandrel 20. Between the feed rolls 70 and the feed rolls 71, over the section 93, shown in Fig. 2, the mandrel 20 changes smoothly from a flat strip 22 to a flat elliptical section 90, to a rounder elliptical section 91, and finally becomes circular at 92. (See Figs. 2b, 2c, and 2d.) Over this section 93 of the mandrel 20, the envelope 60 is formed into a cylindrical tube 100.

The mandrel 20 may be made in several sections which can be welded or threaded together. Thus, there may be the flat strip 22 welded or pinned to the forming portion 93, which may in turn be welded or threaded to the circular portion 94. Similarly, the enlarged or stretching section 95 of the mandrel 20 and the straightening portion 96 may be separate pieces. The portions 94, 95, and 96 may be made hollow to reduce weight. If this be done, it is well to have a plug inserted in the end 97 of the mandrel, so that a pulling pin 98 may be threaded into the plug and used when changing mandrels, for pulling the mandrel 20 out from the machine.

TRIMMING STATION

(Figs. 1, 2e, 10, and 11)

On each side of the mandrel 20 at the end of the gang of feed rolls 71 and driven synchronously with them by the chain 78 is pair of trimming rolls 101 and 102. These trimming rolls 101 and 102 trim off the unnecessary edges 103 which project beyond the seam 61 on each side of the pipe, and thus prepare the tube 100 for the curling in of the seam 61. Each pair of trimming rolls comprises two sharp-edged discs 101 and 102, mounted in the same manner as the feed rolls 71 on axles 81 and 82. Each roll 101 is beveled up away from the sharp edge 104 and each roll 102 is beveled down from the sharp edge 105 which overlaps vertically the edge 104 and is in contact with it so as to insure a sharp cut in the tube flange.

Below the trimming rolls 101 and 102 and supported by the frame 30, I prefer to have a reel 108 (see Fig. 1), supported by and keyed to a shaft 110 journaled into the frame 30. The main drive chain 78 passes down to engage a sprocket wheel 111, also keyed to the shaft 110, to synchronize the reel 108 to the trimming rolls 101 and 102. The strips 103 of metal which are trimmed off the seam 61 may then be wound around the reel 108 and thus be kept out of a position where they might become dangerous or interfere with the work.

STEADY RESTS

(Figs. 15 and 16)

At various points along the machine it is preferable to have steady rests to support the weight of the mandrel 20. All of these rests must be of a type which permits the tube 100 to slide between the rest and the mandrel.

One type of such steady rest consists of a heavy concave roller 114, illustrated in Fig. 10. The roller 114 is shaped to conform to the shape of the mandrel and the tube and is mounted for free rotation on a shaft which is journaled into a bracket on the main frame 30.

Another type of steady rest, illustrated in Figs. 15 and 16 is used to keep the mandrel 20 and the tube 100 in a true line and is preferably adjustable so as to be usable with many sizes of mandrels.

The frame 119 of the rest 120 is a substantially triangular piece with a large circular opening 121 through which can pass the largest size pipe 100 that is to be made on the machine. The frame 119 is held on the main frame 30 in the position where the opening 121 is properly centered. Mounted near the edge of the opening 121, as at the vertices of an equilateral triangle, are three collars 122, welded or otherwise affixed to the frame 119. Mounted for free linear movement within each collar 122 is a shaft 123 having a rack 124 along one side, and terminating in a clevis 125. The shaft 126 is journaled into the clevis 125 and carries a supporting roller 127 mounted for free rotation. The three rollers 127 determine the position of the mandrel 20 and permit the pipe or tube 100 to be passed between them and the mandrel.

Each collar 122 also includes an opening 128 on each side of which are lugs 130 into which are journaled the shaft 131 to which is keyed the pinion 132. The pinions 132 engage the racks 124 and adjust the position of the supporting rollers 122. The shaft 131 extends through the lugs 130 and is also journaled directly in the frame 119, and sprockets 133 are keyed to it on the other side of the frame 119 from the collars 122. The chain belt 134 engages and synchronizes rotation of all the sprockets 133.

Keyed to that shaft 131 which is on the top of the rest 120 is a gear wheel 135 which engages the worm 136 on the axle 137. The wheel 138 is also keyed to the axle 137, so that by turning the handle 140 the operator can simultaneously adjust all three of the supporting rollers 127 and move them in or out to fit the desired sizes of mandrel and pipe.

The steady rests 141, 142, and 143 (see Fig. 3) are in every way similar to the steady rest 120, except that they have no mandrel 20 to support and serve only to guide the completed pipe 100.

FOLDING-IN ROLLS

(Figs. 1, 2f, 2g, 2h, 12, 13 and 14)

It is desirable in most cases to close each seam 61 in against the wall of the pipe 100, and this is best accomplished in several operations. If the pipe 100 is not to be stretched over the step 95 in the mandrel as described in the next section, two operations are sufficient, and in some cases one would be enough. If, however, the pipe 100 is to be stretched beyond its elastic limit by the step 95, it is well to have the pair of curling rolls which complete the closing-in operation located aft of the stretching section of the mandrel. As illustrated in Fig. 1, it is preferable to have the two pairs of preliminary closing-in rollers 150 and 151 located between the trimming rolls 101 and 102 and the steady rest 120. Since the third pair of curling-in rolls 152 are identical in operation and construction to the rolls 151, they are not separately illustrated in detail.

On each side of the pipe 100 is a carriage 154 having the collars 155 which ride on the oppositely threaded ends of the axle 156, so that the in and out position of the rolls 150 and 151 is adjusted by turning the handle 157 on the wheel 158. Two stub shafts 161 and 162 are mounted vertically on the plate 160 on the top of each carriage 154 and support the rollers 150 and 151 for free rotation. No external power is needed to drive these crushing rolls 150 and 151; their position and their shape governs their action, and the movement of the pipe 100 against them supplies the necessary power. The rolls 150 bend the seam 61 up (or down) about 45 degrees into the position shown in Figs. 12 and 2f. The other pair of crushing rolls 151 bend the seams 61 in almost against the walls of the pipe, to the position shown in Fig. 2g. The final pair of crushing rolls 152 close the seam 61 in flush against the wall of the pipe 100.

Opposite the rolls 150, 151, and 152 in the mandrel 20 are the rollers 164, 165, and 166. They are mounted for free rotation on the stub shafts 167, 168, and 169, respectively, in the openings 170, 171, and 172, in the side of the mandrel 20. The rolls 164, 165, and 166 are flush with the surface of the mandrel 20, and prevent the crushing rolls 150, 151, and 152 from imposing too much friction between the mandrel 20 and the inside wall of the pipe 100 and from scarring the inside of the pipe 100. Also it eliminates any wear or crushing of the mandrel.

EXPANSION OF THE PIPE

(Figs. 1 and 2)

A pipe formed around a mandrel in the manner heretofore described takes the shape of the mandrel. It is still, however, somewhat flexible as it passes through the steady rest 120, and if it were removed from the mandrel 20 at that stage, the thin-walled pipe might tend to go out of round somewhat. To prevent this and to stiffen the pipe 100 so that it will be more resistant to blows throughout its life, it is advisable to stretch the pipe just beyond its elastic limit.

The tapered stretching section 95 of the mandrel 20 is a short, truncated, right circular cone, over the surface of which the circumference increases up to its final desired dimension. The straightening section 96 of the mandrel, which is a cylinder of the final diameter, insures that the pipe will come off the end 97 of the mandrel 20 perfectly straight and with a minimum tendency to distortion.

As before mentioned, the stretching section 95 tends to uncurl the seam 61 slightly from the sides of the pipe 100, and the flattening rolls 152 along the straightening section 96 fold the seam 61 in snugly against the pipe wall. After passing between the rollers 152 and 166, the pipe 100 passes off the end 97 of the mandrel 20 and is complete. It is still a continuous piece of pipe, and within the limits of the location of the machine and the length of the strip may be run off the mandrel to any length and then cut off at the desired place.

CUT-OFF STATION

*(Figs. 3, 17, 18 and 19)*

Fig. 3 shows the cut-off end of the machine, and Figs. 17 and 18 show the cut-off saw in more detail. Three steady rests 141, 142, and 143 are sufficient to support the pipe 100 in a straight line, without any mandrel, and more of them or some of the type of the roller 114 may be added if desired.

The cut-off mechanism includes a traveling metal band saw 200 mounted in a frame having provision for gripping the pipe 100 around the place through which it is desired to make the cut. The frame and saw are carried axially by the pipe as the saw makes a perpendicular cut. The mechanism is automatically returned to its original position when it has completed the cut. The blade 201 of the band saw 200 is mounted in the frame 202 between the two gripping blocks or vises 203 and 204. The truck 205, which supports the saw frame 202, the gripping blocks 203 and 204 and all the other parts of the traveling saw 200, are mounted on casters 206 which roll freely along the top surface of the horizontal rails 207, and the hold-down casters 208 roll along the bottom surface of the rails 207 and prevent the carriage 205 from being lifted off the top of the rail 207. The bottom casters 208 are pereferably mounted on stub shafts 210, journaled in the brackets 211. The axles 212 which are journaled into the truck side frames 213, support the top casters 206. During the cut-off operation the truck 205 and all that it supports is moved along the rails 207 by movement of the pipe 100 to which the grips 203 and 204 have clamped it.

Each gripping block 203 or 204 is composed of two sections 216 having substantially semi-circular gripping faces 215. On the bottom of each frame section 216 is a flanged member 218 which slidably supports it on the rail 217 for movement to or from the pipe 100. Beneath each flange 218 is a bracket 220 on which is pivoted a rod 221. The pair of rods 221 from the block 203 and the block 204 are joined to the opposite ends 223 and 224 of a double lever 222 pivoted on and keyed to the shaft 225. Also keyed to the shaft 225 is the bell crank 226, the opposite end of which pivots freely on the ball 228 at the end of the shaft 227. Movement of the shaft 227 back and forth moves the halves of the clamps 203 and 204 toward or away from each other and the pipe 100.

The shaft 227 is moved by the hydraulic cylinder 250. An electric eye 251 (see Fig. 19) is set from the initial position of the saw blade 201 at a distance equal to the desired pipe length. When the end of the pipe 100 interrupts the beam of light 252, the electric eye 251 closes a circuit, and the relay switch 253 is actuated to send power to move the piston 254 in the hydraulic cylinder 250. The shaft 227 is thereby moved, and it causes the gripping blocks 203 and 204 to close in and grip the tube 100. The saw carriage 205 then moves along with the pipe 100.

The saw blade 201 itself is a standard electric band saw blade. The frame 202 is about level when the saw is at the top of its stroke and is at a substantial angle when at the bottom of the stroke. One side of the blade frame 202 is pivoted on the ball 230. The cam roller 231, which is mounted on the shaft 232 in the clevis 233 of the leg 234 of the other side of the blade frame 202, rolls along the cam 235. At the beginning of the sawing operation the convex cam roller 231 engages the cam rail 235 on its inward side and at the end of the operation it is in the position shown in Fig. 18.

The first portion 236 of the cam 235 is inclined at a very slight angle, so that the blade 201 saws very gradually through the top of the pipe. When the blade 201 is safely through the top part of the tube 100, the angle of the cam track 235 is substantially increased in the section marked with the numeral 237. The cam angle is again reduced over the last section 238 to slow down the saw and prevent damage and ripping of the bottom of the pipe 100. By having the parts 236 and 237 of the cam 235 made in one piece and the section 238 made separate from it, the cam 235 can be made adjustable for different sizes of pipe. Thus the section 238 can be placed lower on the frame 30 for a larger pipe.

When the saw blade 201 has completely sawn through the pipe 100 the switch 242 is closed and the hydraulic cylinder 245 raises the saw frame 202 and saw blade 201 past the sawn end of the pipe 100. When the frame 202 has been raised, the switch 243 is closed to release the pressure of the grips 203 and 204 against the pipe 100 by closing the valve 246 which admits fluid to the cylinder 250. Meanwhile the knob 240 on the frame 205 trips the lever 241 which actuates the time-delay relay switch 247. After the period of delay to allow the end of the unsawn tube 100 to reach the steady rest 142, the relay 246 operates the hydraulic cylinder 248 to move the saw truck 205 back to its original position.

OPERATION

The make-ready includes the following:

The mandrel 20 corresponding to the size of tubing desired, is anchored by the block 26, and is supported by the steady rests 114 and 120. The welding rolls 50 and 51, feed rolls 70 and 71, trimming rolls 101 and 102, steady rests 120, and folding-in rolls 150, 151, and 152 are adjusted to the correct distances away from the mandrel 20, and the rolls 10 and 11 of the proper width of strip stock 12 and 13, are installed on the axles 14 and 15.

Once the parts are adjusted and the strips are fed in, the whole operation is automatic and continuous.

The strips 12 and 13 are pulled out by hand from the rolls 10 and 11 and are placed above and below the substantially flat portion of the mandrel 20. Their edges are brought between the guide rolls 45 and up to the first pair of feed rolls 70. Then the power is turned on, and the feed rolls 70 continuously propel the tube through the machine. Welding is simultaneously begun at the seaming rolls 50 and 51, and the seam 61 is then formed continuously. The initial unwelded part of the tube beyond the welding rolls 50 and 51 when the welding started can be cut off as scrap.

The feed rolls 70 propel the flat envelope or sleeve 60 over the section 93 of the mandrel 20, where the tube 100 changes shape from a generally flat cross-section into a generally round cylindrical cross-section. The feed rolls 71 grasp the seams 61 at that point and aid in propelling the tubing 100 from there on.

The feed rolls may also be reversed to back up the tubing 100 and the mandrel 20 by its lost-motion connection 27, so that after a stoppage the seam 61 may be made continuous by having the welding electrodes run over a part of the seam a second time.

The trimming rolls 101 and 102 trim away the waste 103 from the seams 61, and the first two folding-in rolls 150 and 151 begin the folding in of the seams 61 against the wall of the tubing 100. After the tube 100 has been propelled over the stretching section 95 of the mandrel 20, the rolls 152 complete the folding-in operation.

When the tube 100 passes off the end 97 of the mandrel 20, it goes between the gripping blocks 203 and 204 and continues on until its end intercepts an electric eye device which causes the gripping blocks 203 and 204 to close on the tube. The cut-off saw 200 then travels along with the tube 100. As the cam roller 231 rolls down on the cam 235, the saw 200 cuts through the tube 100, slowly at first, then faster, and slower again at the end. When the tubing is cut through, the gripping blocks 203 and 204 release the tube, and the saw 200 is returned to its initial position, where it repeats the operation when actuated again by the electric eye, and cuts off each section of the continuously formed tube 100.

What is claimed is:

1. A machine for making double seamed metal tubing continuously from two rolls of flat sheet metal stock, which includes an extended base frame; a tapered mandrel having its tapered end secured by said end to said frame; means for feeding continuously two pieces of substantially flat metal stock into an overlying position on opposite sides of said tapered portion with a minimum of distortion from the flat position while still retaining their edges in alignment; a welding station positioned alongside the tapered portion of said mandrel and beyond the point where it is secured in said frame, having welding means for engaging the edges of the continuously passing, relatively flat sheets and for securing the edges together to form of it at that point a flattened envelope before the mandrel imparts to the envelope its final cross-sectional shape; and means positioned alongside said mandrel and beyond the welding station for engaging said continuously fed tubing to propel it over and off the end of said mandrel.

2. The device of claim 1 in which the means for securing said mandrel in said frame includes a lost-motion connection so that after a shut down and preparatory to starting up, the continuous sheet material, the seamed tubing and the mandrel may be moved backward in relation to said frame and said welding station thereby to enable the welding means to renew the welding of the side seam at a point beyond where the welding means came to rest when the machine was shut down.

3. The device of claim 1 in which said mandrel has a stepped expanded portion over which said tubing passes after it has been shaped by the preceding portions of the mandrel, said stepped portion being sufficiently enlarged to stretch said tubing material beyond its elastic limit.

4. The device of claim 1 in which means are provided for moving said mandrel and said welding means relative to each other so that following a shut down of the machine with tubing still on the mandrel, the welding means can be brought into contact with the side seams ahead of the point where they came to rest thereon, whereby when the machine starts up, said welding means will pass over a portion of the side seams a second time.

5. In a machine for making complete tubing sections of any desired lengths automatically and continuously from a pair of flat metal strips fed into the machine from magazines, the combination of a base frame of extended length; feed means at one end of said frame to bring said flat metal strips into juxtaposition with their adjacent edges in general alignment; a mandrel mounted in said frame and having its end adjacent said feed means tapered to a thin flattened cross-section; means for passing said metal strips onto said mandrel and holding their edges in contact with a minimum distortion of the cross-section of said strips from a flat condition; welding means mounted adjacent said last-named means for seaming said edges together on opposite sides of said flattened mandrel to form said strips into a sleeve-like tube; propelling mechanism in engagement with said welded seams for continuously feeding said sleeve-like tube over said mandrel; means for shearing off any excess of said welded seams; means for bending said seams in against the wall of said tubing; and movable cut-off means for selectively engaging the wall of said tubing, said means including a cut-off saw which severs said tubing when it has passed the end of said mandrel while it is moving continuously in said machine.

6. The device of claim 5 in which said mandrel has a stepped expanded portion over which said tubing passes after it has been shaped by the preceding portions of the mandrel, said stepped portion being sufficiently enlarged to stretch said tubing material beyond its elastic limit.

7. A machine for making continuous metal tubing from two sheets of strip sheet metal stock, said machine including a base frame of extended length, a tapered mandrel extending for a substantial distance along said frame, transverse means for fastening the thin end of said mandrel near one end of said frame, means for continuously feeding one sheet of said strip metal stock over and the other sheet under said transverse fastening means, welding means positioned alongside said mandrel beyond said fastening means which engage and press together the adjacent edges of said strip stock and weld the edges as the stock advances over said mandrel, and propelling means positioned alongside said mandrel beyond said welding means which engage the welded seams on each side of said strip stock and propel it along and off the end of said mandrel.

8. The device of claim 7 in which there is a lost-motion connection between said mandrel fastening means and said frame whereby after a shut down and when restarting the machine, said mandrel and whatever tubing is on it may be moved bodily in respect to said frame toward said fastened end to enable the welding means to renew welding beyond the point where the welding electrodes came to rest on the side seams when the machine was shut down.

9. A machine for making double seamed metal tubing continuously from two rolls of flat sheet metal stock, which includes an extended base frame; a tapered mandrel secured in said frame; means for feeding continuously two pieces of substantially flat metal stock into an overlying position on opposite sides of the tapered portion of said mandrel with a minimum of distortion from the flat position while still retaining their edges in alignment; a welding station positioned alongside said tapered portion having welding means for engaging the edges of the continuously passing, relatively flat sheets and for securing the edges together to form of it at that point a flattened envelope before the mandrel imparts to said envelope its final cross-sectional shape; and means positioned alongside said mandrel and beyond the welding station for engaging said continuously fed tubing to propel it over and off the end of said mandrel.

10. In a machine for making complete tubing sections of any desired lengths automatically and continuously from a pair of flat metal strips fed into the machine from a suitable source of supply, the combination of a base frame of extended length; feed means at one end of said frame to bring said flat metal strips into juxtaposition with their adjacent edges in general alignment; a mandrel mounted in said frame and having its end adjacent said feed means reduced in cross-section; means for passing said metal strips onto opposite sides of the reduced end of said mandrel and holding their edges in contact with a slight distortion of the cross-section of said strips from a flat condition; welding means mounted adjacent said last-named means for seaming said edges together on opposite sides of said reduced portion of said mandrel to form said strips into a sleeve-like tube; propelling mechanism for continuously feeding said sleeve-like tube over said mandrel; and cut-off means for selectively engaging the wall of said tubing to cut it to the desired length.

11. A method for making thin walled tubing from two strips of substantially flat sheet stock as a continuous progressive operation which includes the steps of feeding said strips, while maintaining same substantially flat, into position on opposite sides of the small end of a mandrel of gradually increasing cross section; said small end being of such reduced section as not to distort the sheets from a substantially flat position; continuously and progressively seaming said strips together on opposite sides of the small end of the mandrel while the strips are being advanced, thereby to produce a generally flat tubular section at said seaming station; and thereafter continuously and progressively shaping said tubular section into the cross-sectional shape desired, by forcing it over the remaining portions of said mandrel.

12. A machine for making double seamed metal tubing continuously from two pieces of substantially flat sheet metal stock, which includes an extended base frame; a mandrel of gradually changing cross-section having its smaller end secured to said frame; means for feeding and propelling continuously two pieces of substantially flat metal stock into an overlying position on opposite sides of the small end of said mandrel with a minimum of distortion from the flat position while still retaining their edges in substantial alignment; and a welding station positioned alongside the smaller end of said mandrel, having welding means for engaging the edges of the continuously passing sheets and for securing the edges together to form of them at that point an envelope before the mandrel imparts to the envelope its final cross-sectional shape.

13. A machine for making double seamed metal tubing continuously from two pieces of substantially flat sheet metal stock, which includes an extended base frame; a mandrel of gradually changing cross-section having its smaller end secured to said frame; means for feeding continuously two pieces of substantially flat metal stock into an overlying position on opposite sides of the small end of said mandrel with a minimum of distortion from the flat position while still retaining in substantial alignment the edges to be welded; a welding station positioned alongside the small end of said mandrel, having welding means for engaging the edges of the continuously passing sheets and for securing the edges together to form of them at that point an envelope before the mandrel imparts to the envelope its final cross-sectional shape; and means positioned alongside said mandrel and beyond the welding station for engaging said continuously fed tubing to propel it over and off the end of said mandrel.

14. A machine for making double seamed metal tubing continuously from two pieces of flat sheet metal stock, which includes an extended base frame; a tapered mandrel secured in said frame; means for feeding and propelling continuously two pieces of substantially flat metal stock into an overlying position on opposite sides of the tapered portion of said mandrel with a minimum of distortion from the flat position while still retaining in alignment the edges to be welded; and a welding station poositioned alongside said tapered portion having welding means for engaging the edges of the continuously passing, relatively flat sheets and for securing the edges together to form of them at that point a flattened envelope before the mandrel imparts to said envelope its final cross-sectional shape.

15. In a machine for making complete tubing sections of any desired lengths continuously from a pair of substantially flat metal strips fed into the machine from a suitable source of supply, the combination of a base frame of extended length; guide means to bring said flat metal strips into substantially parallel opposed relationship with their surfaces to be joined substantially opposed to and aligned with each other; a mandrel mounted in said frame and having its end nearer said last named means reduced in cross-section; means for passing said metal strips onto opposite sides of the smaller end of said mandrel and holding their edges in contact with a slight distortion of the cross-section of said strips from a flat condition; welding means mounted adjacent said last-named means for seaming said edges together on opposite sides of said reduced portion of said mandrel to form said strips into a sleeve-like tube; propelling mechanism for continuously feeding said sleeve-like tube over said mandrel; and cut-off means for selectively engaging the wall of said tubing to cut it to the desired length.

16. In a machine for making complete tubing sections continuously from a pair of substantially flat metal strips fed into the machine from a suitable source of supply, the combination of a base frame of extended length; guide means to bring said flat metal strips into substantially parallel opposed relationship with their surfaces to be joined substantially opposed to and aligned with each other; a mandrel mounted in said frame and having its end nearer said last named means reduced in cross-section; means for passing said metal strips onto opposite sides of the smaller end of said mandrel and holding their edges in contact with a slight distortion of the cross-section of said strips from a flat condition; and welding means for seaming said edges together on opposite sides of said reduced portion of said mandrel to form said strips into a sleeve-like tube, whereby as said sleeve passes on over said mandrel it will be formed into a tube of the desired cross-section.

17. In a machine for making complete tubing sections of any desired lengths continuously from a pair of flat metal strips fed into the machine from a suitable source of supply, the combination of a base frame of extended length; feed means to bring said flat metal strips into substantially parallel opposed relationship with their surfaces to be joined substantially opposed to and aligned with each other; a mandrel mounted in said frame and having its end adjacent said feed means reduced in cross-section; welding means mounted adjacent the small end of said mandrel for positioning and securing said edges together on opposite sides of said reduced portion of said mandrel to form said strips into a sleeve-like tube; and propelling mechanism for continuously feeding said sleeve-like tube over said mandrel.

18. In a machine for making complete tubing sections continuously from a pair of substantially flat metal strips fed into the machine from a suitable source of supply, the combination of a base frame of extended length; a mandrel mounted in said frame and having the end nearer said source of supply reduced in cross section; means in said frame for positioning said strips in substantially parallel opposed relationship with their surfaces to be joined substantially opposed to and aligned with each other on opposite sides of the reduced end of said mandrel and for propelling said strips along said mandrel; welding means combined with said means for securing said strips together on opposite sides of said reduced portion of said mandrel to form said strips into a sleeve-like tube, whereby as said propelling and positioning means moves said tube over said mandrel said mandrel will change the cross section of said tube into its final shape.

ALAN KINKEAD.

REFERENCES CITED

The following references are of record in the file of this patent:

UNITED STATES PATENTS

| Number | Name | Date |
|---|---|---|
| 146,868 | Brooks | Jan. 27, 1874 |
| 545,953 | Friedrick | Sept. 10, 1895 |
| 722,398 | Bock | Mar. 10, 1903 |
| 794,433 | Thibodeau | July 11, 1905 |
| 1,945,594 | Chase | Feb. 6, 1934 |
| 1,966,349 | Kronquest | July 10, 1934 |
| 2,098,989 | Yoder | Nov. 16, 1937 |
| 2,257,823 | Stokes | Oct. 7, 1941 |
| 2,329,938 | Ortiz | Sept. 21, 1943 |
| 2,350,410 | Murphy | June 6, 1944 |

FOREIGN PATENTS

| Number | Country | Date |
|---|---|---|
| 482,558 | Germany | of 1930 |